United States Patent [19]

Littman

[11] Patent Number: 5,803,889
[45] Date of Patent: Sep. 8, 1998

[54] PACKET MAILERS AND THE METHODS AND APPARATUS FOR MAKING THEM

[76] Inventor: Gerald A. Littman, 638 The Strand, Hermosa Beach, Calif. 90254

[21] Appl. No.: 706,297

[22] Filed: Aug. 30, 1996

Related U.S. Application Data

[60] Continuation of Ser. No. 315,335, Sep. 29, 1994, abandoned, which is a division of Ser. No. 29,157, Mar. 10, 1993, abandoned, which is a continuation-in-part of Ser. No. 919,168, Jul. 23, 1992, abandoned, which is a continuation-in-part of Ser. No. 635,956, Dec. 28, 1990, abandoned.

[51] Int. Cl.⁶ .............................. B31B 1/24; B65B 11/48
[52] U.S. Cl. ..................... 493/267; 493/188; 493/216; 493/231; 493/264; 493/921
[58] Field of Search .................... 493/188, 216, 493/227, 231, 233, 235, 238, 239, 254, 264, 267, 357, 358, 359, 439, 440, 441, 442, 921, 923, 248, 265, 266, 446

[56] References Cited

U.S. PATENT DOCUMENTS

| | | | |
|---|---|---|---|
| 2,263,637 | 11/1941 | Simson | 493/291 |
| 2,355,348 | 7/1944 | Welliver | 229/92.1 |
| 2,723,078 | 1/1955 | Tilly | 229/92.8 |
| 3,197,121 | 7/1965 | Hayes | 229/92.1 |
| 3,618,284 | 11/1971 | Gendron | 493/187 |
| 3,718,277 | 2/1973 | Volkert | 229/73 |
| 3,858,792 | 1/1975 | Volkert | 229/73 |
| 3,995,808 | 12/1976 | Kehoe | 229/73 |
| 4,044,942 | 8/1977 | Sherwood | 229/486 |
| 4,063,398 | 12/1977 | Huffman | 493/216 |
| 4,530,730 | 7/1985 | Bradley | 493/216 |
| 4,530,731 | 7/1985 | Bradley | 493/216 |
| 4,543,082 | 9/1985 | Stenner | 493/216 |
| 4,726,802 | 2/1988 | Volk | 493/231 |
| 4,726,804 | 2/1988 | Stitcher | 493/226 |
| 4,860,945 | 8/1989 | Breen | 493/216 |
| 4,865,247 | 9/1989 | Grabner | 229/92.1 |
| 4,883,220 | 11/1989 | Brown | 493/187 |
| 4,984,733 | 1/1991 | Dunn | 493/216 |
| 5,046,710 | 9/1991 | Vijuk | 493/231 |
| 5,071,399 | 12/1991 | Ashby | 493/216 |
| 5,095,682 | 3/1992 | Steidinger | 493/216 |
| 5,213,560 | 5/1993 | Crowley | 493/264 |
| 5,290,225 | 3/1994 | Younger | 493/921 |
| 5,328,438 | 7/1994 | Crowley | 493/188 |

*Primary Examiner*—Joseph J. Hail, III
*Assistant Examiner*—Christopher W. Day
*Attorney, Agent, or Firm*—Patrick F. Bright

[57] ABSTRACT

A method for making a packet mailer includes the steps of applying wet glue patterns to a sheet, then folding that sheet and perforating the sheet to form a packet mailer that includes an outer enclosure with at least two open ends and at least one inner closure.

6 Claims, 10 Drawing Sheets

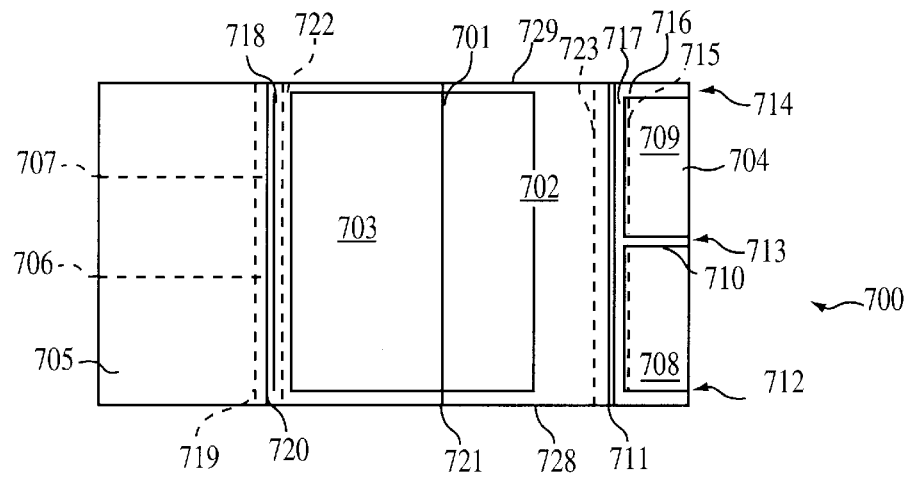
FIG. 20
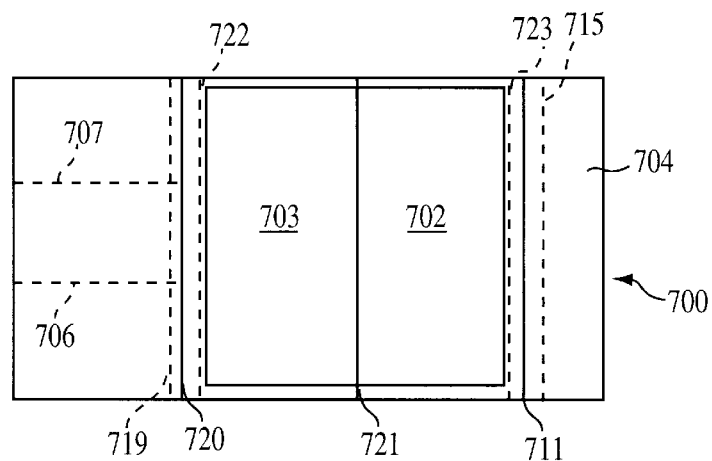
FIG. 21
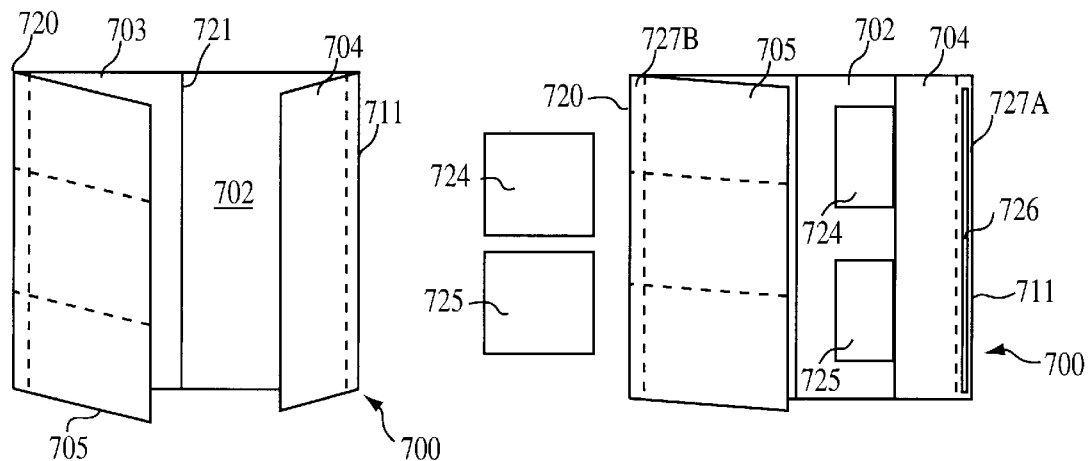
FIG. 22
FIG. 23

PACKET MAILERS AND THE METHODS AND APPARATUS FOR MAKING THEM

This application is a continuation of pending prior application Ser. No. 08/315,335 filed Sep. 29, 1994 which is a division of application Ser. No. 08/029,157 filed Mar. 10, 1993, which is a continuation-in-part of application Ser. No. 07/919,168 filed Jul. 23, 1992 which is a continuation-in-part of application Ser. No. 07/635,956 filed Dec. 28, 1990, for "PACKET MAILERS AND THE METHODS AND APPARATUS FOR MAKING THEM" by Gerald A. Littman, all now abandoned.

BACKGROUND OF THE INVENTION

This invention relates generally to advertising and order solicitation material consisting of printed matter in a variety of forms packaged in such a way as to be mailable to prospective customers. More specifically, the invention relates to the packaging of such material in forms permitting their manufacture by automated methods and techniques.

A popular direct-mail marketing and fund solicitation technique is to combine in one unified package printed matter soliciting contributions or offering merchandise for sale, a pledge card or order form, and a return envelope thereby providing the ultimate in convenience to the targeted direct-mail audience and encouraging a favorable response. The manufacture of such "mailers" can be a complicated process, involving as it does the printing of a number of separate and distinct items and the assembly of these items into a common mailable enclosure. The process is particularly burdensome when the targeted audience is large and the production of large quantities of the mailers are required in a reasonable period of time.

The high-speed automated production of mailers of the type described above has thus far eluded solution. Instead, production approaches have emphasized the use of combination of machines, each machine performing its specialized task of printing, binding, folding, or assembling, the bridging of the work product from one machine to the next being accomplished either by manual labor or by other specialized interfacing machines.

SUMMARY OF THE INVENTION

The packet mailer is a mailable self-contained combination of printed materials to be used in merchandising and fund solicitation activities. The packet mailer offers unique advantages over competing mailers in that it is designed for automated manufacturability thereby permitting the rapid production of large quantities at low cost.

The conceptual basis of the packet mailer is a sequence of mechanical operations performed either on single sheets or on a single continuous sheet ("web") that results in a printed outer enclosure, a plurality of printed inner enclosures contained within the outer enclosure, and a perforated printed tear strip to which the outer and inner enclosures are attached. The tearing off of the tear strip results in the separation of the inner enclosures from each other and from the outer enclosure thereby making the individual items conveniently available for examination and use.

The packet mailer can be manufactured in a variety of configurations. The simplest configuration is one where a folded outer enclosure encloses a single-sheet advertising insert, two or more single-sheet advertising inserts, or one or more folded single-sheet inserts. Any of these inserts can be perforated to form detachable forms such as coupons. A more complicated configuration is one where the outer enclosure encloses not only an advertising insert but also a return envelope. For even greater convenience, a detachable order form can be attached to the enclosed return envelope.

Another simple configuration comprises a packet mailer made of a single sheet of a printable medium having a fold at one side, a perforated tear strip at an opposing side, and two additional, opposing open sides. Detachment of the tear strip permits the mailer to be unfolded, exposing the interior of the mailer to view. Optionally, this configuration of the mailer may have a panel appended to the outer edge of the tear strip, formed by folding and gluing part of one side of the mailer to itself at the outer edge of the tear strip. The mailer may also be perforated along the fold to permit detachment of one side of the mailer from the other side. One or both sides of the mailer may be internally perforated to form one or more detachable forms such as coupons.

Alternatively, or in addition, one or both sides of the packet mailer can form a postcard or an envelope with or without a flap bearing remoistenable adhesive. Such a postcard can be formed by folding and gluing one side of the mailer against itself. The other side of such packet mailers may include perforated, detachable forms such as order forms to be returned in the envelope that forms part of the packet mailer itself.

Alternatively, one or both sides of the packet mailer can include one or more internal compartments. These compartments are sealed along the opposing, open sides of the packet mailer, and are also sealed to the tear strip, but are open on the inside of the packet mailer. The tear strip seal may, in one embodiment, lie entirely on the tear strip itself, or may, in a second embodiment, also lie, in part, on the inner surface of the packet mailer. Removal of the tear strip from the first embodiment opens the compartments at the tear strip removal line, permitting removal of the contents of the compartments to the inside or to the outside of the packet mailer itself. Removal of the tear strip from the second embodiment leaves the compartments sealed along the outside, with the compartments open only on the inside of the packet mailer.

These internal compartments can be machine-filled or hand-filled with pouches, packets or removable advertising material. These compartments can be also subdivided into a plurality of compartments by sealing along lines between the tear strip line and the inside opening of the compartment to form two, three or more individual sub-compartments in the packet mailer.

The manufacture of packet mailers can be accomplished with commercially-available printing industry equipment and apparatus except for special web folding and gluing machines. The key to packet mailer manufacturing efficiency is the special web folding and gluing machines and the particular arrangement of machines to obtain the desired sequence of operations.

One of the objects of the invention is to provide merchandisers—particularly those merchandisers who deal with high-volume mailings and are under time constraints—with a more effective and less expensive means for carrying out direct-mail marketing campaigns. Another object is to provide the merchandiser with a flexible means for achieving his objectives. Still another object is to provide a mailer that attracts the recipient's attention and encourages his response.

BRIEF DESCRIPTION OF THE DRAWINGS

FIG. 20 is a plan view of the inside of a single sheet layout of a packet mailer comprising an outer enclosure and, attached to the outer enclosure at the outer edge of the tear strip on one side, an inner enclosure such as advertising pieces, detachable coupons, or the like, and, on the other side, one or more compartments formed by folding and gluing part of one side of the layout to itself along the opposing, open sides of the packet mailer and along the tear strip.

FIG. 21 is a plan view of the outside of the single sheet layout embodiment shown in FIG. 20.

FIG. 22 is a perspective view of a partially-assembled packet mailer of FIGS. 20 and 21.

FIG. 23 is a perspective view of the partially-assembled packet mailer of FIG. 22 with the seal line formed along the tear strip and with samples inserted in the internal compartments of the packet mailer.

DESCRIPTION OF THE PREFERRED EMBODIMENTS

A packet mailer is comprised of an outer enclosure and a plurality of inner enclosures which may be either advertising inserts or return envelope enclosures. A return envelope enclosure can consist of a single return envelope, several return envelopes, or a return envelope and at least one attachment which might be, for example, an order form.

Packet mailers can be fabricated from single sheets of a printable medium such as paper or from a web—a large roll of a printable medium used for the continuous feeding of a printing press.

The fabrication of all packet mailers begins with printing operations whereby printed matter is placed on either or both sides of the sheet or web that will become one or more packet mailers. Subsequent fabrication operations depend on the packet mailer configuration.

Figure 1:
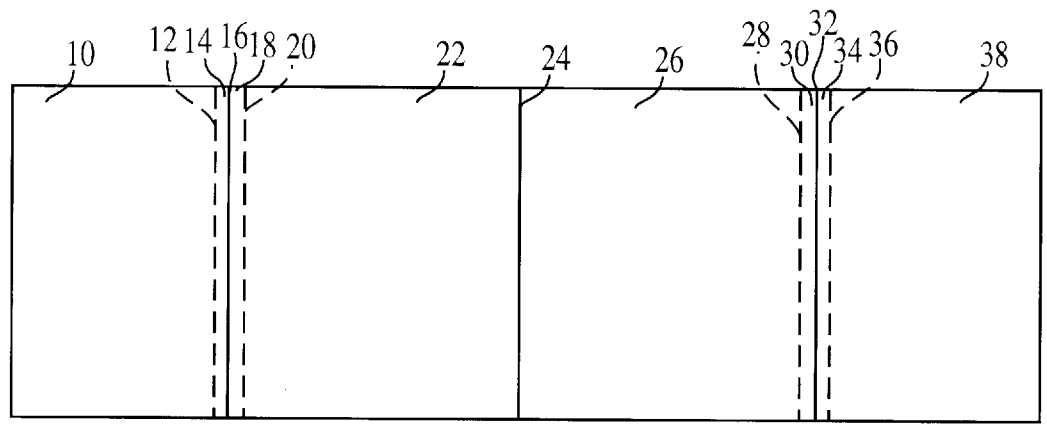
FIG. 1 is a plan view of a single-sheet layout of a packet mailer comprising an outer enclosure and two-inner enclosures, each inner enclosure being an insert.

The layout of a packet mailer wherein the inner enclosures are two single-sheet inserts is shown in FIG. 1. Left insert 10 joins through tear strips 14 and 18 to outer enclosure left side 22. Right insert 38 joins through tear strips 30 and 34 to outer enclosure right side 26.

The fabrication of the packet mailer from printed sheets or webs is accomplished by applying wet glue to tear strips 14 and 34, folding left insert 10 on top of outer enclosure left side 22 about first fold line 16, folding right insert 38 on top of outer enclosure right side 26 about second fold line 32, applying wet glue to what is the bottom surfaces of tear strips 14 in FIG. 1, and finally folding outer enclosure left side 22 on top of right side 26 about third fold line 24 thereby enclosing and sealing inserts 10 and 38 within outer enclosure 22, 26, and causing tear strips 14, 18, 30, and 34 to be glued together into a single tear strip. The inserts are so dimensioned that left insert 10 does not overlap outer enclosure right side 26 and right insert 38 does not overlap outer enclosure left side 22. The concluding step in the process is to perforate the boundary line between tear strips 14, 18, 30, and 34 and inserts 10 and 38 and outer enclosure 22, 26, the boundary line being superimposed edges 12, 20, 28, and 36 of the tear strips.

Figure 2:
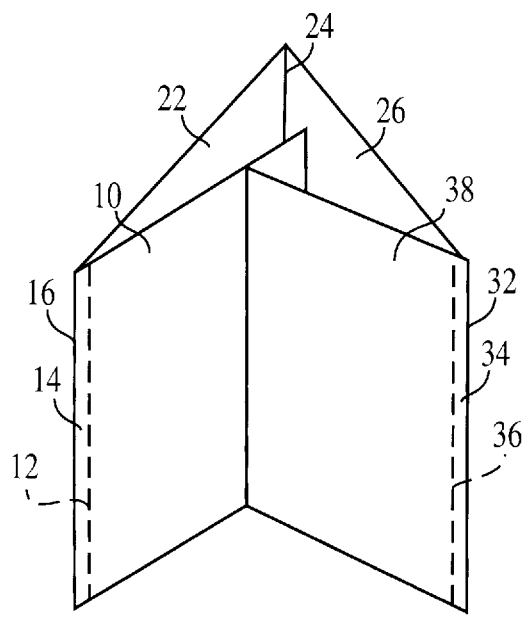
FIG. 2 is a perspective view of the partially-assembled packet mailer of FIG. 1

A perspective view of the partially-assembled packet mailer is shown in FIG. 2. To complete the assembly, left insert 10 would be placed in contact with outer enclosure left side 22 and right insert 38 would be placed in contact with outer enclosure right side 26. Then left and right sides 22 and 26 would be pressed together thereby enclosing inserts 10 and 38 and sealing outer enclosure 22, 26.

It should be noted that tearing off the tear strip from the packet mailer permits the outer enclosure 22, 26 to be opened and the two inserts 10 and 38 to be individually removed.

Figure 3:
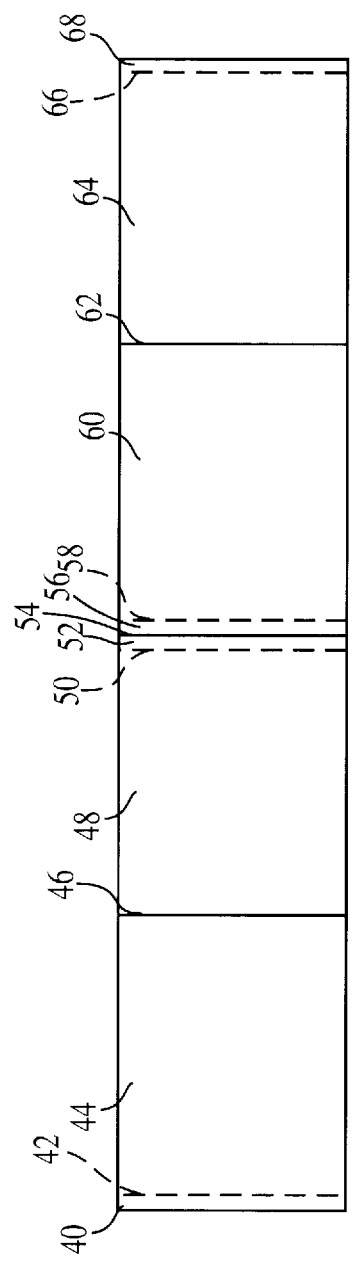
FIG. 3 is a plan view of a single-sheet layout of a packet mailer comprising an outer enclosure and a folded inner enclosure, the inner enclosure being an insert.

The layout of a packet mailer having a single folded insert is shown in FIG. 3. The folded insert consists of a left side 44 and right side 48. Right side 48 joins through tear strips 52 and 56 to outer enclosure left side 60.

Fabrication of the packet mailer from printed sheets or webs is accomplished by applying wet glue to the bottom surface of tear strip 40 and folding insert left side 44 on top of insert right side 48 about first fold line 46 so that the back surfaces make contact. Wet glue is applied to the front surface of tear strip 52 and folded insert 44, 48 is folded on top of outer enclosure left side 60 about second fold line 54 so that the front surfaces of insert right side 48 comes in contact with outer enclosure left side 60 and tear strips 52 and 56 are glued together.

Finally, wet glue is applied to the front surface of tear strip 68 and outer enclosure right side 64 is folded on top of folded insert 44, 48 about third fold line 62 thereby enclosing folded insert 44, 48 within outer enclosure 60, 64 and sealing the assembly at superimposed tear strips 40, 52, 56, and 68.

The fabrication process is completed by perforating along the superimposed tear strip edges 42, 50, 58, and 66.

Figure 4:
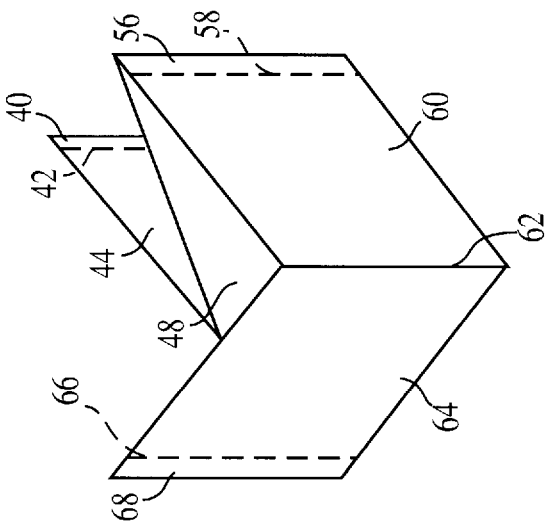
FIG. 4 is a perspective view of the partially-assembled packet mailer of FIG. 3.

A perspective view of the partially-assembled packet mailer of FIG. 3 is shown in FIG. 4. To complete assembly, insert left side 44, insert right side 48, and outer enclosure left side 60 would be pressed together and outer enclosure right side 64 would be folded over insert left side 44 thereby sealing the folded insert 44, 48 within the outer enclosure 60, 64.

Here also, it should be noted that tearing off the tear strip from the packet mailer permits outer enclosure 60, 64 to be opened and folded insert 44, 48 to be removed.

Figure 5:
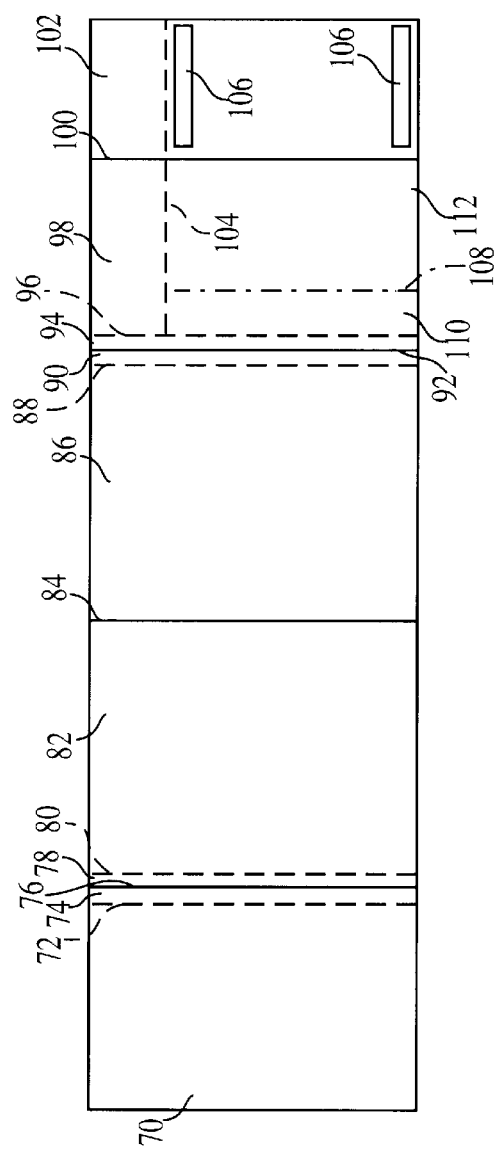
FIG. 5 is a plan view of a single-sheet layout of a packet mailer comprising an outer enclosure and two inner enclosures, one inner enclosure being an insert and the other being a return envelope enclosure consisting of a return envelope and an attachment.

The layout of a packet mailer having both an insert and a return envelope enclosure consisting of a return envelope and an attachment is shown in FIG. 5. Insert 70 joins through tear strips 74 and 78 to outer enclosure left side 82. Return envelope enclosure consisting of attachment left side 98 and right side 102 and return envelope flap 110, front 112, and back 114 joins through tear strips 90 and 94 to outer enclosure right side 86.

The fabrication of this version of the packet mailer from printed sheets or webs begins with the application of remoistenable glue to the return envelope flap 110. Remoistenable glue is wet glue which, when deposited on a surface and dried, will adhere to another surface when remoistened.

Next, perforated line 104 is made between return envelope flap 110, front 112, and back 114 and attachment left side 98 and right side 102 thereby providing to the recipient of the mailer a convenient means for separating the attachment from the return envelope.

Score line 108 is made between envelope flap 110 and envelope front 112 so that the flap may easily be folded over the back of the envelope by the recipient of the mailer.

The fabrication of the return envelope is accomplished by applying wet glue to glue regions 106 and folding return envelope back 114 and attachment right side 102 on top of return envelope front 112 and attachment left side 98 about first fold line 100, first fold line 100 being so positioned that the return envelope back 114 almost completely overlaps front 112 but does not overlap flap 110.

Wet glue is applied to the top surface of tear strip 74 and insert 70 is then folded on top of outer enclosure left side 82 about third fold line 76 thereby gluing tear strips 74 and 78 together. Insert 70 is so dimensioned that it does not overlap outer enclosure right side 86.

Wet glue is applied to the top surface of tear strip 94 and the folded return envelope enclosure 98, 102, 110, 112, 114 is then folded on top of outer enclosure right side 86 about second fold line 92 thereby gluing tear strips 90 and 94 together. The return envelope enclosure is so dimensioned that the folded return envelope does not overlap outer enclosure left side 82.

Wet glue is now applied to what is the bottom surface of tear strip 74 in FIG. 5 and outer enclosure left side 82 is folded on top of outer enclosure right side 86 thereby enclosing the folded return envelope enclosure and the insert within the outer enclosure and sealing the outer enclosure as a result of gluing tear strips 72 and 94 together. Tear strips 74, 78, 90, and 94 are at this pint all glued together thereby forming a single tear strip.

The concluding step in the process is to perforated the boundary line between tear strips 74, 78, 90, and 94 and outer enclosure left side 82 and right side 86, the boundary line being superimposed edges 72, 80, 88, and 96 of the tear strips.

Figure 6:
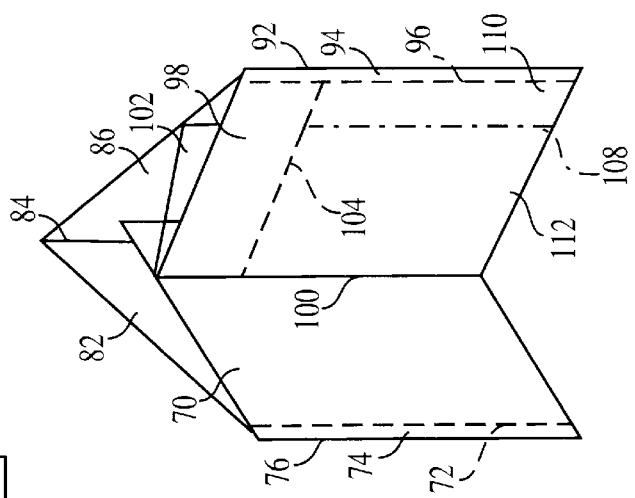
FIG. 6 is a perspective view of the partially-assembled packet mailer of FIG. 5.

A perspective view of the partially-assembled packet mailer of FIG. 5 is shown in FIG. 6. To complete assembly, insert 70 would be pressed against outer enclosure left side 82, folded return envelope enclosure 98, 102, 110, 112, 114 would be pressed against outer enclosure right side 86, and finally, outer enclosure left side 82 and right side 86 would be pressed together thereby sealing the insert and the return envelope enclosure within the outer enclosure.

Again, it should be noted that tearing off the tear strip from the packet mailer permits the outer enclosure 82, 86 to be opened and insert 70 and return envelope enclosure 98, 102, 110, 112, 114 to be individually removed.

Figure 8:
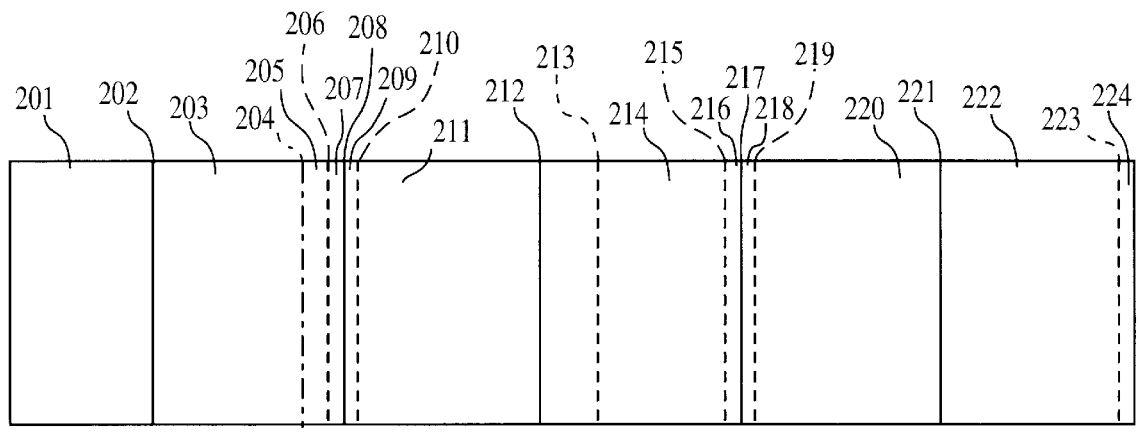
FIG. 8 is a side view of a single-sheet layout of a packet mailer comprising an outer enclosure and two inner enclosures, one of the inner enclosures being an insert and the other being a return envelope.
Figure 9:
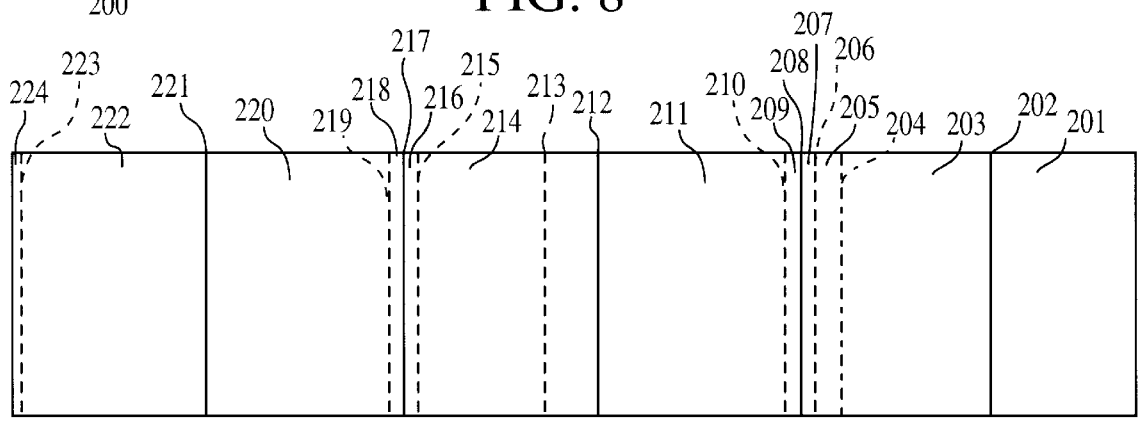
FIG. 9 is a side elevation view of the other side packet mailer shown in FIG. 8.
Figure 10:
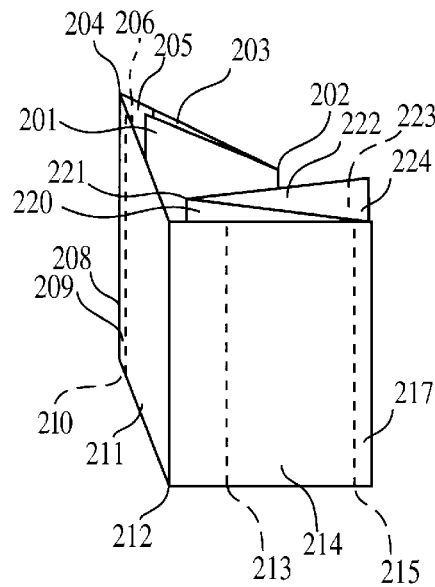
FIG. 10 is a perspective view of the partially-assembled packet mailer of FIGS. 8 and 9.

A layout of a packet mailer 200 wherein one of the inner enclosures is a folded insert sheet and the other is an envelope is shown in FIGS. 8–10. The envelope enclosure is formed by folding flap 201 along fold 202 into facing relationship with flap 203. Flap 201 is glued to the surface of flap 203 by glue strips applied parallel to the top and bottom edges of panel 203. The thus-formed envelope includes fold line 204 for envelope flap 205 that bears remoistenable glue for sealing the envelope in use.

The envelope is, after its formation, folded right-to-left against panel 211, and a tear strip is partially formed by applying wet glue to areas 207 and 209, and placing them in face-to-face relationship.

A two-panel insert is formed on the other side of this mailer by folding panel 220 against panel 214 after wet glue is applied to areas 216 and 218. Thereafter, panel 222 is folded against the back surface of panel 220, and wet glue is applied to area 224 to glue panel 222 to the tear strip partially formed by areas 216 and 218. Final assembly of this mailer requires folding the right-hand portion of the packet mailer against the left-hand portion of the packet mailer along fold line 212, and gluing the strips to one another along the outside of areas 218, 216, 207, 209, and 224.

Figure 11:
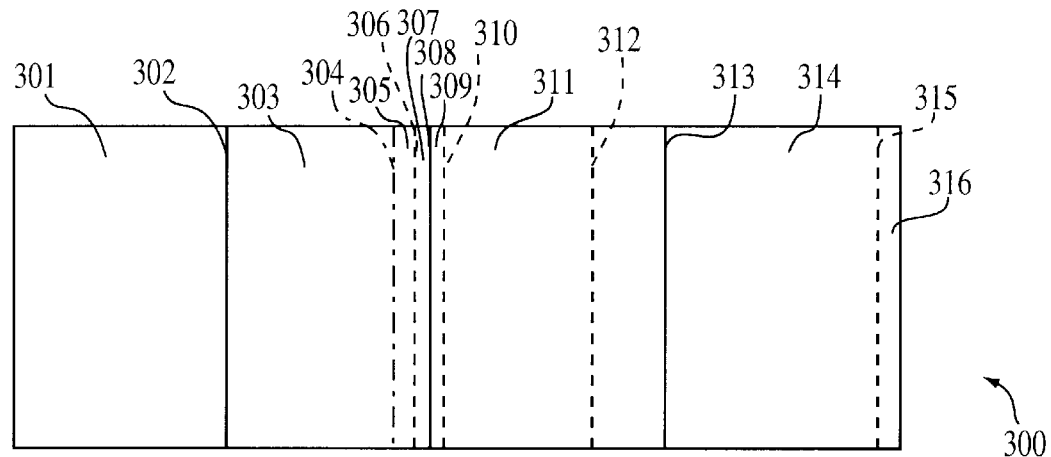
FIG. 11 is a side view of a single-sheet layout of a packet mailer comprising an outer enclosure that, upon opening, constitutes an envelope on one side and a detachable response form on the other side.
Figure 12:
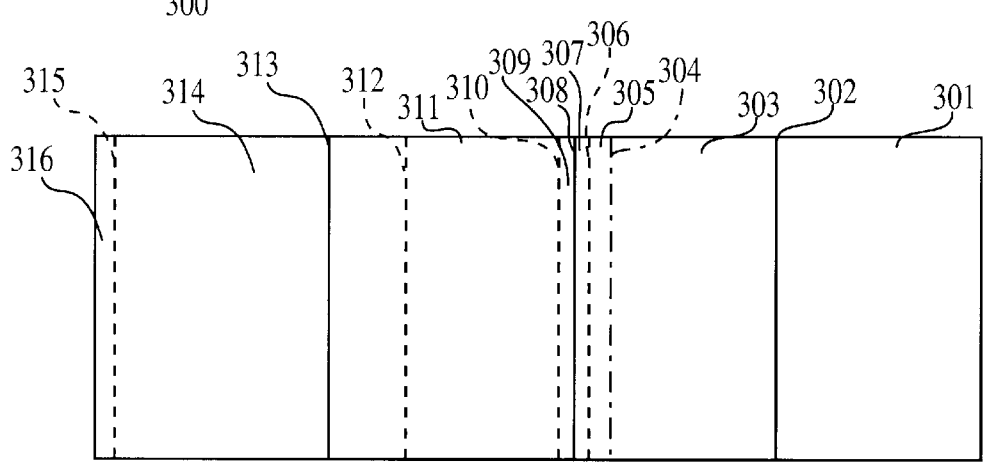
FIG. 12 is a side elevation view of the other side of the packet mailer shown in FIG. 11.
Figure 13:
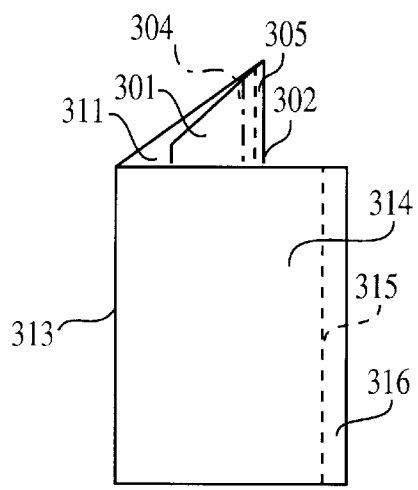
FIG. 13 is a perspective view of the partially-assembled packet mailer of FIGS. 11 and 12.

FIGS. 11–13 show the layout of packet mailer 300 which has no removable inner enclosures, but, instead, has an integrally-formed inner envelope. Packet mailer 300 is formed by folding panel 301 from left to right along fold line 302 against panel 303, and gluing panel 301 to panel 303 by glue strips applied near the upper and lower edges of panel 301. Wet glue is then applied to areas 306 and 309, and the assembled envelope is folded from left to right along fold line 308 to partially form a tear strip. Panel 314 is then folded from right to left along fold line 313, and, after applying wet glue to area 316, area 316 is glued to the outside of the partial tear strip formed by pressing surfaces 307 and 309 together. Mailer 300 also has a perforation along line 312 to permit detachment of a response form from the mailer after opening. The form can be returned in the integrally-formed envelope in the mailer.

Figure 14:
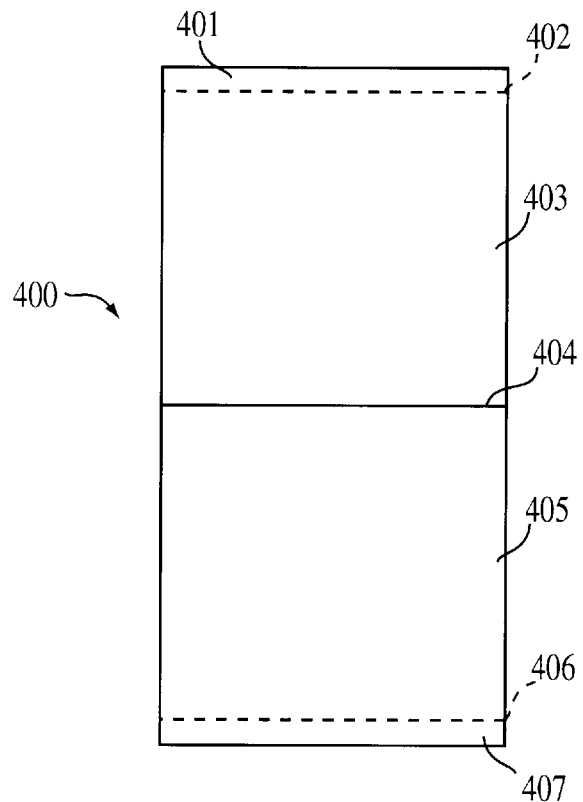
FIG. 14 is a plan view of a single-sheet layout of a packet mailer comprising an outer enclosure.
Figure 15:
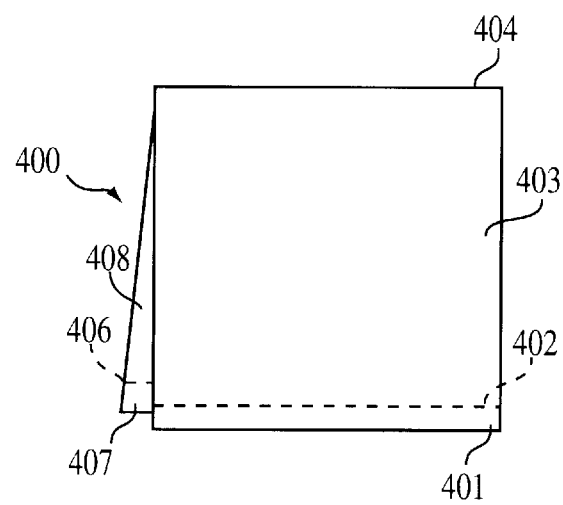
FIG. 15 is a perspective view of the partially-assembled packet mailer of FIG. 14.

FIGS. 14 and 15 show the layout of packet mailer 400 that has two panels 403 and 405. Panel 403 is folded downwardly over panel 405 along fold line 404, and, after wet glue is applied to areas 401 and 407, these areas are pressed together to form a tear strip, which can be removed via perforation lines 402 and 406. Packet mailer 400 can have advertising on both sides of each panel 403 and 405.

Figure 16:
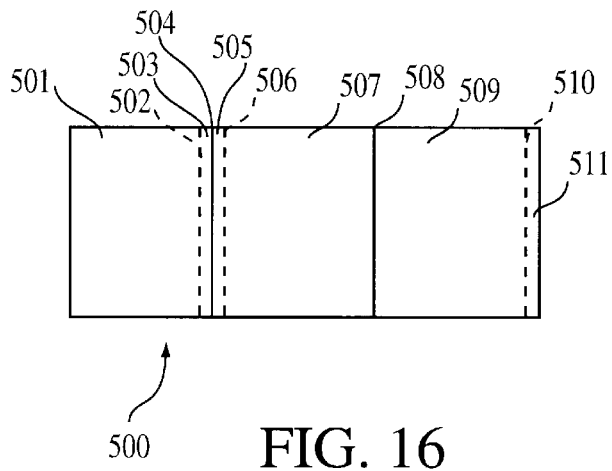
FIG. 16 is a plan view of a single-sheet layout of a packet mailer comprising an outer enclosure and an inner enclosure comprising perforated detachable forms such as coupons.
Figure 17:
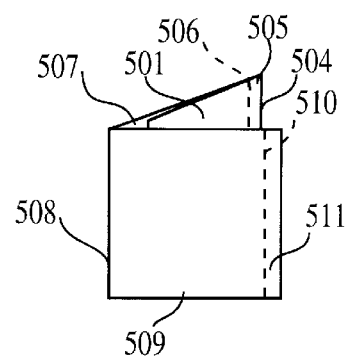
FIG. 17 is a perspective view of the partially-assembled packet mailer of FIG. 16.

FIG. 16 and 17 show the layout of packet mailer 500 having a single insert. Packet mailer 500 includes three panels 501, 507, and 509. Packet mailer 500 is formed by folding panel 501 from left to right against the surface of panel 507 along fold line 504. A tear strip is partially formed by applying wet glue to areas 503 and 505, and pressing the glue-bearing surfaces into face to face contact by folding panel 501 against panel 507. Perforations 502 and 506 permit detachment of the tear strip from mailer 500. After the partial formation of the tear strip, panel 509 is folded from right to left over the back of panel 501, and area 511 is glued to the partially formed tear strip. Perforations 502, 506 and 510 thereupon lie on a coincident line, forming a single detachable tear strip.

Figure 18:
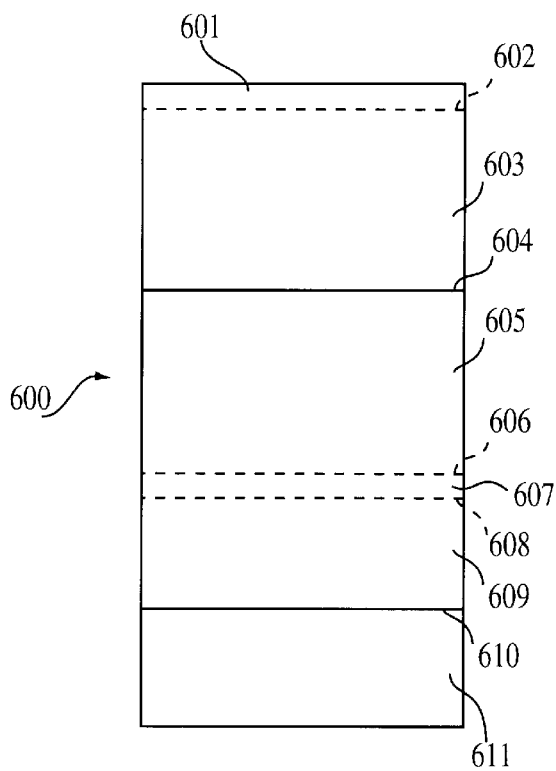
FIG. 18 is a plan view of a single-sheet layout of a packet mailer comprising an outer enclosure and, appended to the outer enclosure at the outer edge of the tear strip, a panel formed by folding and gluing part of one side of the layout to itself.
Figure 19:
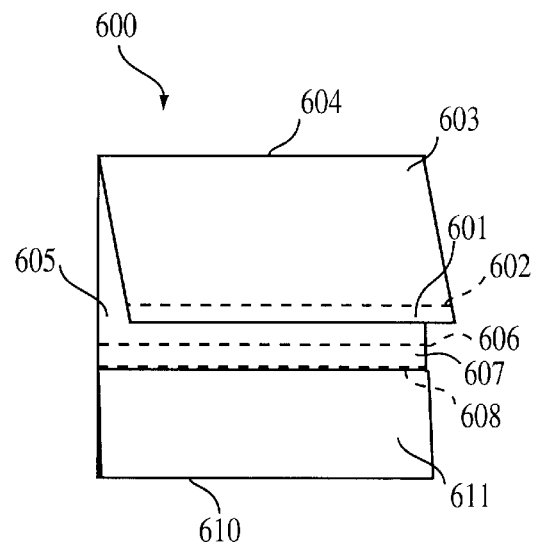
FIG. 19 is a perspective view of the partially-assembled packet mailer of FIG. 18.
Figures 24, 25, 26:
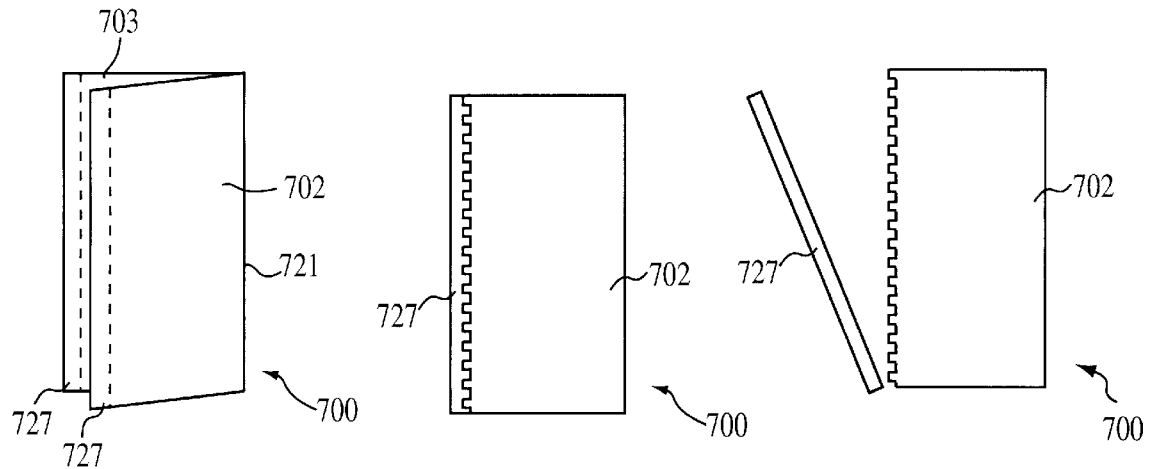
FIG. 24 shows a perspective view of the partially-assembled packet mailer of FIG. 23 with the two outer panels folded against one another.
FIG. 25 shows an elevation view of the finished packet mailer, formed by the assembly steps shown in FIGS. 22–24.
FIG. 26 shows the partial removal of the tear strip from the mailer shown in FIG. 25.
Figure 27:
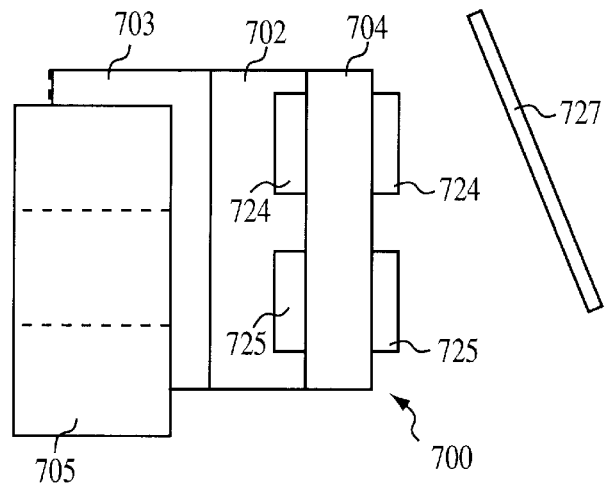
FIG. 27 shows a perspective view of the packet mailer of FIG. 26 after removal of the tear strip, and after opening of the packet mailer to expose the internal compartment and the removable samples inside that compartment.

FIGS. 18 and 19 show the layout of packet mailer 600. Packet mailer 600 is formed by folding panel 611 upwardly against the face of panel 609 along fold line 610, and gluing panel 611 to panel 609 by applying glue to either panel 609, panel 611, or both, so that they adhere to one another. Wet glue is also applied to areas 601 and 607, and then panel 603 is folded downwardly against panel 605 with the wet glue on area 601 engaging the wet glue on area 607 to form a tear strip. The tear strip is completed with perforations along lines 608, 606, and 602.

FIGS. 20–23 show the layout and assembly of packet mailer 700. Packet mailer 700 is formed by folding panel 705 inwardly against the face of panel 703, and by gluing at glue line 718 to form, in part, tear strip 727. In so doing, perforation line 719 is folded against perforation line 722 to form a part of perforated tear strip 727. Similarly, panel 704 is folded against panel 702 with glue lines 714 and 712 forming seals between the inside of panel 704 and the inside of panel 702 along the opposing open sides 728 and 729. Glue line 710 divides the compartment formed by the folding and gluing of panel 704 against panel 702 into two pockets labeled "POCKET 1" and "POCKET 2". Panel 704 is also glued along glue line 716 or glue line 717. Glue line 716 extends beyond perforation 715 so that, upon removal of tear strip 727, the compartment formed between 704 and 702 remains sealed along the tear strip line. Alternatively, by gluing at glue line 717, removal of the tear strip also opens pockets 1 and 2 for removal of their contents along the tear strip line.

FIG. 22 shows the first assembly steps, namely, folding of panel 704 against panel 702, and folding of panel 705 against panel 703.

FIG. 23 shows the insertion of sample 724 and sample 725 into the compartment formed between panel 704 and 702, and the application of glue line 726 to seal the inner surfaces of tear strip 727, denoted 727A and 727B, to one another.

FIGS. 24, 25, 26 and 27 show the final assembly and gluing of packet mailer 700 (FIG. 24); the finished packet mailer with its tear strip 727 (FIG. 25); the removal of tear strip 727 from packet mailer 700 (FIG. 26); and the result obtained by removal of tear strip 727, namely the separation of coupons or advertising panel 705 from panel 703, and the opening of the compartment between panel 704 and panel 702 for removal of samples 724 and 725 along the tear strip line.

Although the fabrication of packet mailers has been described in terms of particular sequences of steps, it will be evident to one skilled in the art that there are other equally-valid sequences that would lead to the same results. The invention claimed herein is intended to cover all such fabrication sequences in whatever order of steps that result in the manufacture of packet mailers.

Packet mailers fabricated from a web result in a stream of packet mailers connected end to end. One additional step in the fabrication process is required for web-produced packet mailers—the cutting of the web at periodic intervals, after all of the gluing, perforating and folding operations have been completed, in order to separate the stream of packet mailers into individual units.

Figure 7:
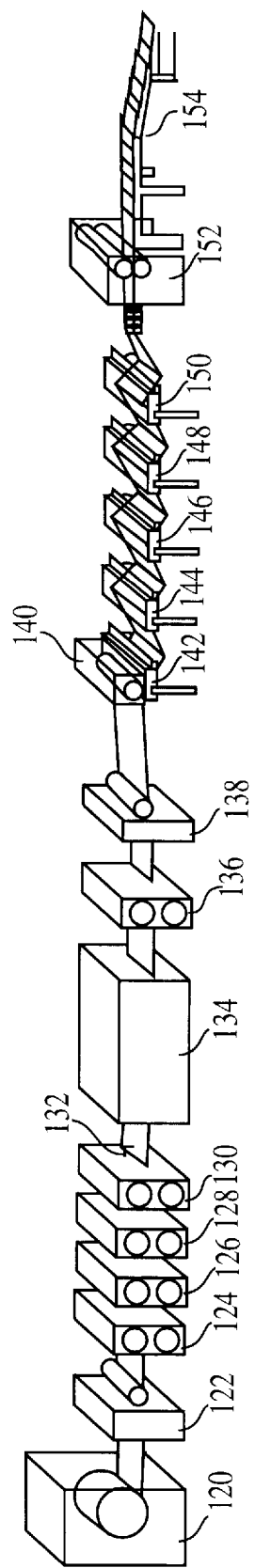
FIG. 7 is a perspective view of the apparatus for making packet mailers.

Apparatus for producing packet mailers in large volumes utilizing a web is shown in FIG. 7. The apparatus consists of a combination of machines in a tandem arrangement whereby a web is guided successively through the various machines, each machine performing a particular step of the manufacturing process. The combination of machines is comprised of both commercially-available machines and machines specially designed for the manufacture of packet mailers.

The manufacturing process begins with the roll splicer 120 which supplies the web from which packet mailers are made. The roll splicer 120 also provides the means for splicing a new web to the web currently feeding the process without interrupting production. Suitable roll splicers are available from a number of manufacturers. The preferred embodiment utilizes a Model BLHRIH & C roll splicer manufactured by Butler (#3 Series).

The imprinter 122 receives the web from the roll splicer 120 and provides the means for individually addressing each packet mailer. Suitable imprinters are available from a number of manufacturers. The preferred embodiment utilizes a non-stop imprinter manufactured by AGM.

The print units 124, 126, 128, and 130 receive the web from the imprinter 122 and provide the means for four-color printing on both sides of the web. Suitable print units are available from a number of manufacturers. The preferred embodiment utilizes Hantscho Mark II print units manufactured by George Hantscho Corporation of Georgetown, Mass.

The line remoistenable gluer 132 applies a streak of remoistenable wet glue of predetermined width and length to and running in the direction of the web as it emerges from the fourth print unit 130. Such a streak of remoistenable glue is needed for the flap of the return envelope. The line remoistenable gluer 132 consists of a pressurized glue container, a glue dispensing means mounted on the fourth print unit 130 in close proximity to the web, a hose connecting the glue container the glue dispensing means, and a glue dispensing control means which is synchronized to the print unit 130 and causes glue to be dispensed for a predetermined period of time thereby controlling the length of the streak of glue applied to the web. The position of the glue dispensing means is adjustable along the width of the web. All of the components of the line remoistenable gluer are well-known and understood in the art.

The air dryers 134 receive the web after the remoistenable glue has been applied and dry the printed web prior to the gluing and folding operations. Suitable air dryers are available from a number of manufacturers. The preferred embodiment utilizes TEC Air Dryers manufactured by TEC Corporation.

The heat added to the web by the air dryers 134 is removed by the chilling unit 136. Suitable chilling units are available from a number of manufacturers. The preferred embodiment utilizes a chilling unit manufactured by George Hantscho Corporation of Georgetown, Mass.

The perforated lines that do not run with the web are placed on the web by the pattern perforator 138. Suitable machines for performing this function are available from a number of manufacturers. The preferred embodiment utilizes a Harris Pattern Perforator manufactured by AGM, i.e. the Pattern Perforator.

The pattern wet gluer 140 receives the web from the pattern perforator 138 and applies those glue patterns that are not continuous streaks running with the web. An example of this type of glue pattern is that used in gluing the front and back of the return envelope together as illustrated by glue regions 106 shown in FIG. 5. Suitable pattern wet gluers are available from a number of manufacturers. The preferred embodiment utilizes an AGM Flex Gluer manufactured by Alpha Graphic Machinery, Inc. of Brookfield, Ill. The pattern wet gluer 140 is mounted on top of the folding unit 142 which performs a folding operation along a line parallel to the web thereby enclosing the glue pattern applied by the pattern wet gluer 140 within the fold of the web.

The folding unit 142 is a custom-designed unit based on well-known and understood principles that are exemplified by the plow folders manufactured by Alpha Graphic Machinery, Inc. of Brookfield, Ill. The unit is capable of creating a fold of up to one-half the web width.

The gluing and folding units 144, 146, 148 and 150 each apply a streak of wet glue to and in the direction of the web and then fold the web onto itself, thereby enclosing the streak of glue within the fold. The folding unit is like the folding unit 142 and the line gluer is like the line remoistenable gluer 132. The line gluer is mounted on the folding unit in such a way as to be adjustable in position across the width of the web.

The gluing and folding units 144, 146, 148, and 150 are optionally capable of creating perforated lines or score lines running with the web and at specified positions across the width of the web. The perforated lines are created by toothed discs bearing against the web while the web is in contact with one of the folding unit rollers that serve to guide the web through the folding unit during the folding operation. The score lines are created by substituting continuous-edge discs for the toothed discs. The perforated lines and the score lines are created after the folding of the web has been completed by the folding unit.

The rotary cutter 152 cuts the folded and glued web that emerges from the gluing and folding unit 150 into individual packet mailers. Suitable rotary cutters are available from a number of manufacturers. The preferred embodiment utilizes a Model 22¾ rotary cutter manufactured by AGM.

The delivery system 154 stacks the individual packet mailers emerging from the rotary cutter 152 in a way convenient for further operations having to do with packing and shipping. The delivery system is constructed with standard components and parts available from a number of manufacturers.

What is claimed is:

1. A method for making a plurality of packet mailers from a substantially continuous web of printable paper comprising:

substantially continuously feeding said web through at least two printing stations for ink printing at least one side of said web with information in at least two different colors, one color at each of said at least two stations in order to form packet mailers having printed information thereon;

substantially continuously feeding said web through a station for applying re-moistenable adhesive at pre-determined remoistenable adhesive locations for making resealable enclosures, when in use, within said plurality of packet mailers;

passing said web, substantially continuously, through a drying station for drying said re-moistenable adhesive and for drying the inks placed on the surfaces of said web;

passing said web, substantially continuously, through a perforating station for placing on said web, at predetermined perforation locations, perforated lines that extend at least partially across said web to form removable inserts within said plurality of packed mailers and allow each respective individually formed packet mailer to be opened from a closed position;

passing said web, substantially continuously, through a station for applying wet adhesive in discontinuous streaks at pre-determined locations on said web to seal each individual packet mailer in the closed position;

passing said web, substantially continuously, through a plurality of adjustable gluing scoring and folding stations sequentially applying, at predetermined wet glue locations, streaks of wet glue to and in the direction of feeding of said web, and sequentially folding said web upon itself to enclose the applied glue within said folds to seal each individual packet mailer in the closed position;

at each of said adjustable stations creating score lines, running with said web, at predetermined score line locations on said web to form fold lines at said predetermined score-line locations; and passing said web, substantially continuously through a cutter to separate individually-formed packet mailers from said web, thereby completing formation of a plurality of packet mailers from said web.

2. The method of claim 1 further comprising:

forming said mailers, substantially continuously, with at least two open sides, with a single binder side along which said packet mailer is folded, and a single tear strip at the side opposite the binder side.

3. The method of claim 1 further comprising:

after said web passes through said pattern perforating station, passing said web, substantially continuously, through at least one station for applying information to said web at desired locations by ink-jetting.

4. The method of claim 3 further comprising:

after said web passes through said ink-jetting station, passing said web, substantially continuously, through a station for forming at least one die cut in said web at desired locations.

5. The method of claim 1 further comprising:

passing said web, substantially continuously, through three or four of said printing stations.

6. The method of claim 1 further comprising:

passing said web through a chilling station after said web passes through said drying station and before said web passes through said perforating station.

* * * * *